United States Patent [19]
Zilm

[11] Patent Number: 5,890,728
[45] Date of Patent: Apr. 6, 1999

[54] EXTENSION COUPLING FOR USE WITH TRAILERS

[76] Inventor: William M. Zilm, 0090 Sunlight Dr., Glenwood Springs, Colo. 81601

[21] Appl. No.: 841,893

[22] Filed: Apr. 17, 1997

[51] Int. Cl.[6] .................................................. B62D 53/06
[52] U.S. Cl. ...................... 280/433; 280/423.1; 280/432; 280/406.2
[58] Field of Search .................................. 280/423.1, 432, 280/433, 438.1, 407.1, 406.2, 439, 440, 476.1

[56] References Cited

U.S. PATENT DOCUMENTS

| | | | |
|---|---|---|---|
| 2,038,975 | 4/1936 | Willetts | 280/433 |
| 2,351,151 | 6/1944 | Sattler | 280/423.1 |
| 2,761,699 | 9/1956 | Martin | 280/423.1 |
| 3,059,795 | 10/1962 | Schroeder | 280/423.1 |
| 3,820,821 | 6/1974 | Leland | 280/433 |
| 3,823,961 | 7/1974 | Korodi | 280/433 |
| 3,861,716 | 1/1975 | Baxter et al. | 280/423.1 |
| 3,972,542 | 8/1976 | Dirks et al. | 280/432 |
| 4,068,860 | 1/1978 | Meyers et al. | 280/432 |
| 4,955,631 | 9/1990 | Meyer | 280/438.1 |
| 5,071,152 | 12/1991 | Ducote | 280/433 |
| 5,135,248 | 8/1992 | Keiserman | 280/432 |

FOREIGN PATENT DOCUMENTS

| | | | |
|---|---|---|---|
| 2529262 | 1/1977 | Germany | 280/455.1 |
| 880848 | 11/1981 | U.S.S.R. | 280/433 |
| 827185 | 2/1960 | United Kingdom | 280/423.1 |

Primary Examiner—J. J. Swann
Assistant Examiner—Gary Savitt
Attorney, Agent, or Firm—Timothy J. Martin; Michael R. Henson

[57] ABSTRACT

An extension coupling releasably interconnects a trailer to a tow hitch on a tractor vehicle. The coupling includes a mount that is secured to the trailer. An elongated arm has a proximal end portion secured to the mount. A connector pin is disposed on a distal end portion of the arm in order to mate with the tow hitch. A retainer assembly is secured to the arm and engages the tow hitch when the trailer is interconnected to the tractor vehicle so as to resist rotation of the arm relative to the tow hitch. The mount includes a flat base plate and a pair of upwardly projecting side plates disposed on the base plate. This mount then engages the hitch connecting station on the trailer. The invention includes a trailer provided with the coupling where the trailer has a housing, a wheel set and the hitch connecting station.

20 Claims, 4 Drawing Sheets

EXTENSION COUPLING FOR USE WITH TRAILERS

FIELD OF THE INVENTION

The present invention broadly concerns the interconnection of a trailer to a tractor vehicle for towing. More particularly, however, the present invention concerns trailer hitch assemblies for travel trailers. The invention specifically is directed to an extension assembly for fifth-wheel trailers.

BACKGROUND OF THE INVENTION

For many years, recreational traveling has enjoyed popularity among a wide spectrum of the population. A concern for any traveler, naturally, is the need to provide for basic needs such as food and shelter. A significant portion of the hotel/motel industry caters to the traveler's need for shelter while the restaurant provides the availability of food and drink.

Despite the availability of overnight accommodations at hotels, motels, and the like, many travelers seek alternative accommodations either as a life-style preference or as a money saving measure. Also, convenient hotel/motel lodgings are not always available at target recreation sites so that alternative accommodations must be made. Here, many travelers prefer to use their own accommodations which are transported with them.

While the simplest form of portable accommodations may be the tent, many travelers find tents to be inconvenient or uncomfortable. Accordingly, many travelers opt for other portable accommodations such as tent, trailers, recreational vehicles, and the travel trailers known as fifth-wheel travel trailers.

As is known, a fifth-wheel travel trailer is, essentially, a small self contained home which may be towed to a desired location by any suitable tractor vehicle, for example, a pick-up truck. The forward portion of the travel trailer is provided with a downwardly depending hitch box and downwardly projecting kingpin. This kingpin is sized and adapted to mate with a standard fifth-wheel hitch which is mounted on the tractor vehicle. Thus, the tractor vehicle supports the travel trailer so that its forward end is elevated above the surface of travel, such as a roadway, while the rear portion of the vehicle is supported on a wheel set so that it may travel over the surface.

The substantial weight of the fifth-wheel travel trailer requires proper loading and mounting of the hitch assembly. Where the typical pick-up truck is employed as the tractor vehicle, the fifth-wheel tow bed hitch is secured in the bed of the pick-up truck above and slightly in front of the rear axle. It is important that the mounting not be located too far forward of the axle to avoid unnecessary bending moments about the axle. Moreover, it is important not to mount the hitch rearwardly of the axle otherwise the tractor vehicle will tend to rear off its front wheels resulting in loss of steering control.

Where a long-bed truck is employed as the tractor vehicle, relatively few difficulties are encountered in the proper mounting of a bed hitch for a fifth-wheel trailer. Recently, though, the popularity of the short-bed pick-up truck has grown. Here, there is a decreased distance between the rear axle of the pick-up truck and the cab. In such cases, as discussed more thoroughly below, the proper mounting of the bed hitch results in adequate clearance between the forward portion of the fifth-wheel trailer and the truck cab.

In order to achieve adequate clearance, the tow hitch may be moved rearwardly in the bed, behind the rear axle. However, as noted above, this creates an undesirable and potentially dangerous towing configuration. Accordingly, a need has arisen for alternative mounting assemblies for fifth-wheel trailer vehicles.

SUMMARY OF THE INVENTION

It is an object of the present invention to provide a new and useful coupling adapted to interconnect a tractor vehicle and a trailer.

Another object of the present invention is to provide an extension coupling for interconnecting a trailer to a tractor vehicle.

A further object of the present invention is to provide a hitch coupling for a trailer that moves the pivot axis of the trailer rearwardly of the tractor vehicle while maintaining the load point of the trailer on the vehicle forwardly of the tractor vehicle's rear axles.

Yet another object of the present invention is to provide an extension coupling which allows the towing of a fifth-wheel travel trailer by a short bed pick-up truck in a safe manner.

Still a further object of the present invention is to provide an extension coupling that allows a short bed pick-up truck to be used to tow a fifth-wheel trailer with diminished risk of damage to either during the towing operation.

To accomplish these objects, then, an extension coupling is provided which is adapted to releasably interconnect the trailer to a tow hitch that is located on the tractor vehicle. Broadly, this extension coupling includes a mount that is adapted to be secured to the trailer and an elongated arm which has a proximal end portion pivotally secured to the mount and a distal end portion opposite the proximal end portion. A connector pin is then disposed on the distal end portion and is adapted to releasably mate with the tow hitch. This allows the trailer to be displaced rearwardly of the tow hitch a distance equal to the length of the elongated arm while at the same time maintaining the loading point on a tractor vehicle.

Preferably, the mount is adapted to be secured to a hitch connecting station on the trailer and is in the form of a base plate and a pair of opposed side plates which are oriented to be fastened to mounting plates that depend downwardly from the front of the trailer. A spindle member extends from the base plate of the mount along the spindle axis with the spindle being rigidly secured to the mount. The elongated arm then includes a receiver sized and adapted to rotatably receive the spindle member so that the arm is pivotable with respect to the mount about the spindle axis. The arm may be structured as a housing which includes a top wall, a bottom wall opposed to the top wall and a surrounding sidewall. Here, the receiver includes a pair of opposed bearing assemblies respectively disposed on the top and bottom wall. The top wall may include a pair of angled sections, one of which is parallel to the bottom wall.

A retainer assembly is also preferably provided in association with the connector pin. The retainer assembly is operative to engage the tow hitch when the trailer is interconnected therewith and is operative to resist rotation of the arm relative to the tow hitch with a selected resistance force. The retainer assembly is preferably constructed as an inner and outer telescoping member one of which is provided with a head piece that is biased toward the connector pin by means of a spring member tending to bias the inner and outer telescoping members apart. The head piece may be structured as a tapered wedge having a forward nose and diverging sidewalls with this head piece sized to engage the typical V-shaped open mouth of a standard tow hitch when the connector pin is engaged by locking arms in the tow hitch. An adjustor is associated with the retainer assembly, with this adjustor being operative to selectively vary the resistance force. The connector pin may preferably be constructed to have a base portion adjacent the distal end of the arm, a shoulder portion opposite the base portion and a waist portion extending between the base and shoulder portions.

These and other objects of the present invention will become more readily appreciated and understood from a consideration of the following detailed description of the exemplary embodiment when taken together with the accompanying drawings, in which:

DETAILED DESCRIPTION OF THE EXEMPLARY EMBODIMENT

The present invention is directed to the interconnection of a tractor vehicle to a trailer so that the trailer may be towed across a transport surface. The invention particularly concerns an extension coupling which interconnects to an existing tow hitch on the tractor vehicle thus to maintain the same loading point on the tractor vehicle while at the same time allowing the trailer vehicle to be displaced a small distance rearwardly of the tractor vehicle. The present invention is specifically useful for fifth-wheel trailers to be pulled by pick-up trucks. Accordingly, the present invention is described with respect to such a truck/trailer combination; however, it should be understood that the present invention may be used in other applications, as well.

Figure 1:
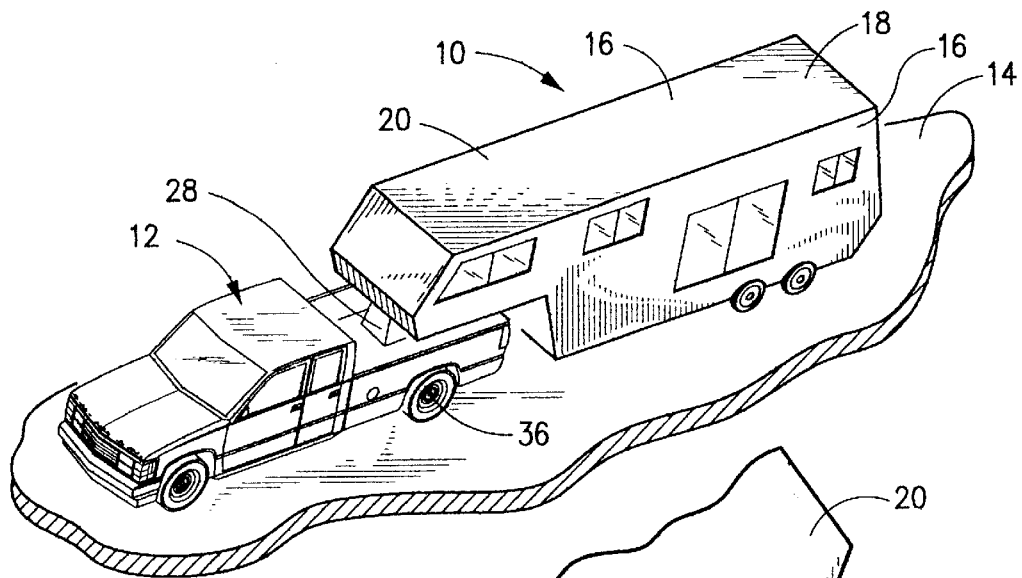
FIG. 1 is a perspective view of a fifth-wheel travel trailer being towed by a tractor vehicle having a short box bed according to the prior art.
Figure 2:
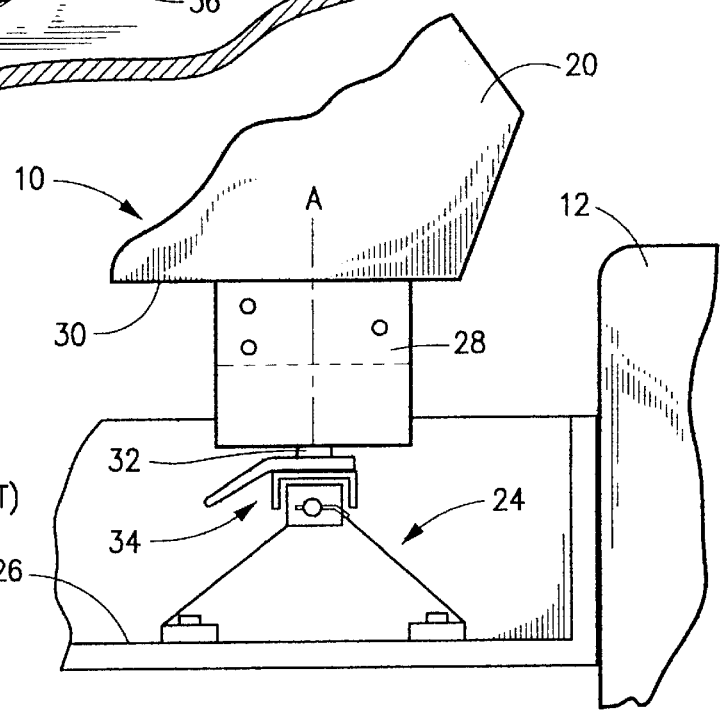
FIG. 2 is a side view in partial cross-section showing the mounting of the fifth-wheel trailer of FIG. 1 to the bed of the tractor vehicle according to the prior art.

A trailer hitch coupling for a fifth-wheel trailer according to the prior art is generally shown in FIGS. 1 and 2. In FIG. 1, it may be seen that a fifth-wheel trailer 10 is adapted to be towed by a tractor vehicle in the form of a short bed pick-up truck 12 so that it may be moved along a transport surface such as a roadway 14. Trailer 10 has a housing 16 having a rear portion 18 and a front portion 20. Rear portion 18 of housing 16 is supported on surface on roadway 14 by means of a wheel set 22. Front portion 20 of housing 16 is connected to truck 12 and is supported thereby.

With reference now to FIG. 2, it may be seen that the traditional interconnection of trailer vehicle 10 to truck 12 is accomplished by a fifth-wheel bed hitch 24 which is mounted in the bed 26 of truck 12. Insofar as the fifth-wheel bed hitch 26 is of a standard type, such as the Reese Classic 18, its structure is not completely described herein. In any event, though, a connector box 28 is secured to mounting plates on front portion 20 of trailer 10 so that connector box 28 downwardly depends from an underside 30 of front portion 20. A connector pin 32 depends downwardly from connector box 28 and is engaged by a cooperative double-acting releasable locking mechanism 34 provided on bed hitch 24. With this mounting, trailer 10 may rotate about a vertical axis "A" that is oriented slightly forwardly of the rear axle for rear wheels, such as rear wheels 36 (FIG. 1).

It is important that bed hitch 24 be mounted as close to the rear axle of truck 12 as possible so as to allow the weight of trailer 10 to be supported directly above the axle. It is desirable, though, that the bed hitch 24 be mounted slightly forwardly of the rear axle, though, in order to diminish the likelihoods that truck 12 will "rear" onto its back tires with the front tires having diminished contact with the roadway or other support surface. The tendency of the vehicle to rear under heavy loads is substantially increased if bed hitch 24 is either mounted directly above or rearwardly of the rear axle of truck 12.

Figure 4:
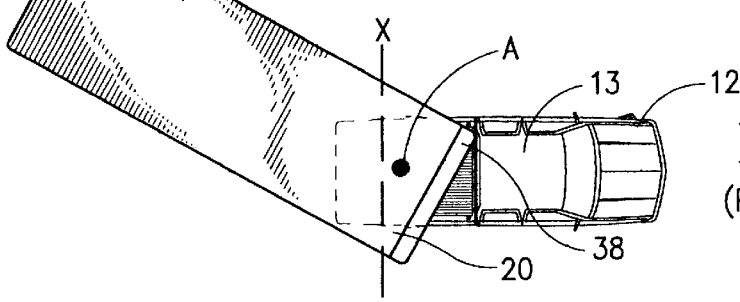
FIG. 4 is a top plan view of the truck and trailer combination of FIGS. 1 and 3 showing its reduced turning radius.
Figure 3:
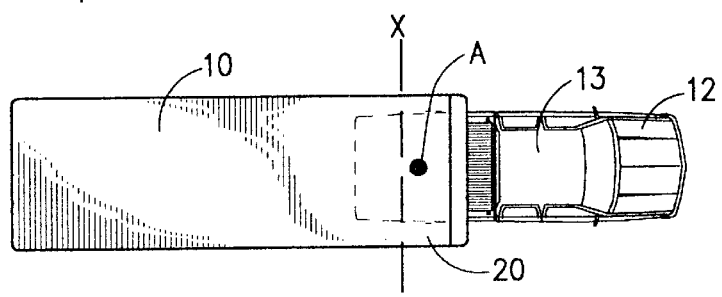
FIG. 3 is a top plan view of the prior art truck and trailer combination of FIG. 1 with the trailer being towed in a straight line.

With reference now to FIGS. 3 and 4, a disadvantage of the prior art may now be appreciated where truck 12 is a short bed pick-up truck. Here, it may be seen that, in order to keep the bed hitch forwardly of the rear axle, so that axis "A" is forward of the rear axle, as is represented by transverse axis "X" results in diminished spacing between cab 13 of truck 12 and forward portion 20 of trailer 10. While towing trailer 10 in a straight line, as is shown in FIG. 3, this causes no problems. However, the turning radius of the combination of truck 12 and trailer 10 is diminished, as is shown in FIG. 4. As is shown in this figure, when the vehicle is making a turn, the corner 38 of forward portion 20 can contact cab 13 which can result in damage to truck 12, trailer 10 or both. The present invention is directed to resolving this problem.

With now to FIGS. 5–9, it may be seen that extension coupling 40 according to the exemplary embodiment of the present invention, is constructed to interconnect with a standard bed hitch 24 so as to maintain the load point of trailer 10 forwardly of the rear axle of the truck while at the same time displacing the trailer 10 a selected distance rearwardly of truck 12. Moreover, the present invention maintains the pivot axis for trailer 10 at the existing connector box attachment, all as described more thoroughly below.

Figure 5:
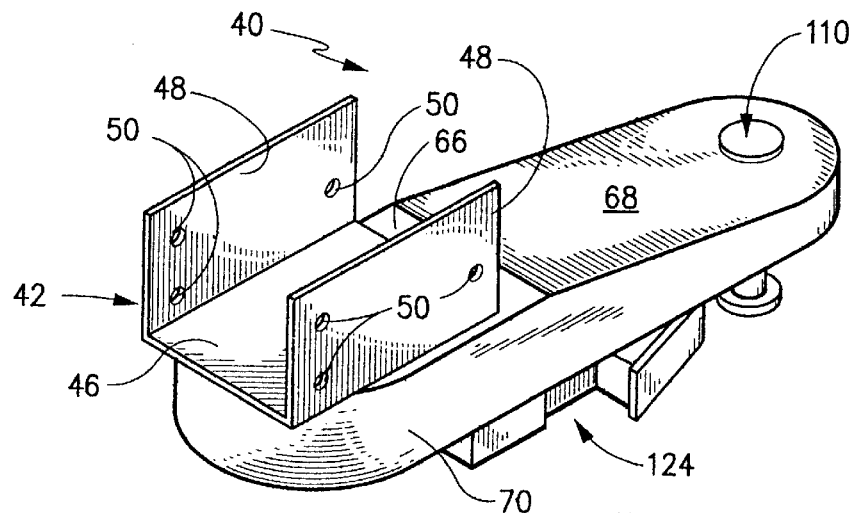
FIG. 5 is a perspective view of the extension coupling according to the present invention.
Figure 6:
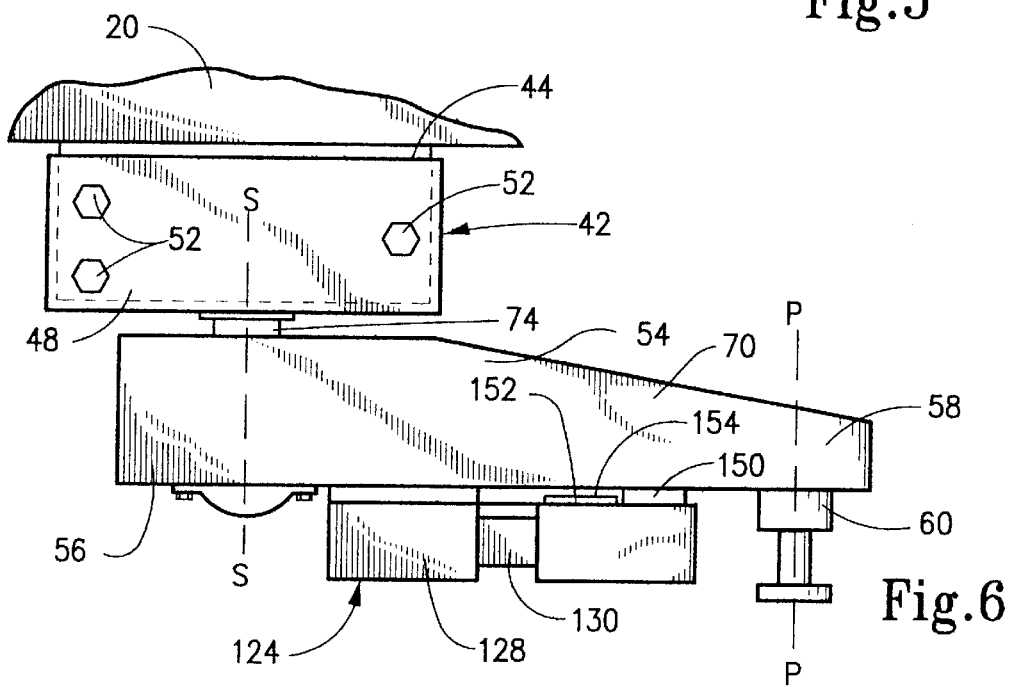
FIG. 6 is a side view in elevation of extension coupling shown in FIG. 5.

Turning to FIG. 5, then, it may be seen that extension coupling 40 includes a mount 42 that is adapted to be secured to the trailer such as to mounting plates 44 which downwardly depend from front portion 20. Mount 42 includes a base plate 46 from which a pair of opposed, parallel side plates 48 upwardly extend. Mounting holes 50 are formed in side plate 48 and are positioned to engage plates 44 on front portion 20 of trailer 10. As is shown in FIG. 6, mount 42 may be secured to plates 44 by means of nut and bolt sets 52 as is known in the art.

An elongated arm 54 has a proximal end portion 56 that is pivotally secured to mount 42 and a distal end portion 58 that is opposite proximal end portion 56. Distal end portion 58 supports a connector pin 59 of a standard type. Here, connector pin 50 has a base portion 60, a shoulder portion 61 and a waist 63 of reduced dimension. Connector pin 59, of course, is adapted to releasably mate with the tow hitch on the tractor vehicle. Accordingly, connector pin 59 depends downwardly from distal end portion 58 along a pin axis "P". In use, axis "P" is general vertical of the transport surface. A retainer assembly 124, described more thoroughly below, is located on a lower side of arm 54 so that it projects toward connector pin 59 radially of axis "P".

Figure 8:
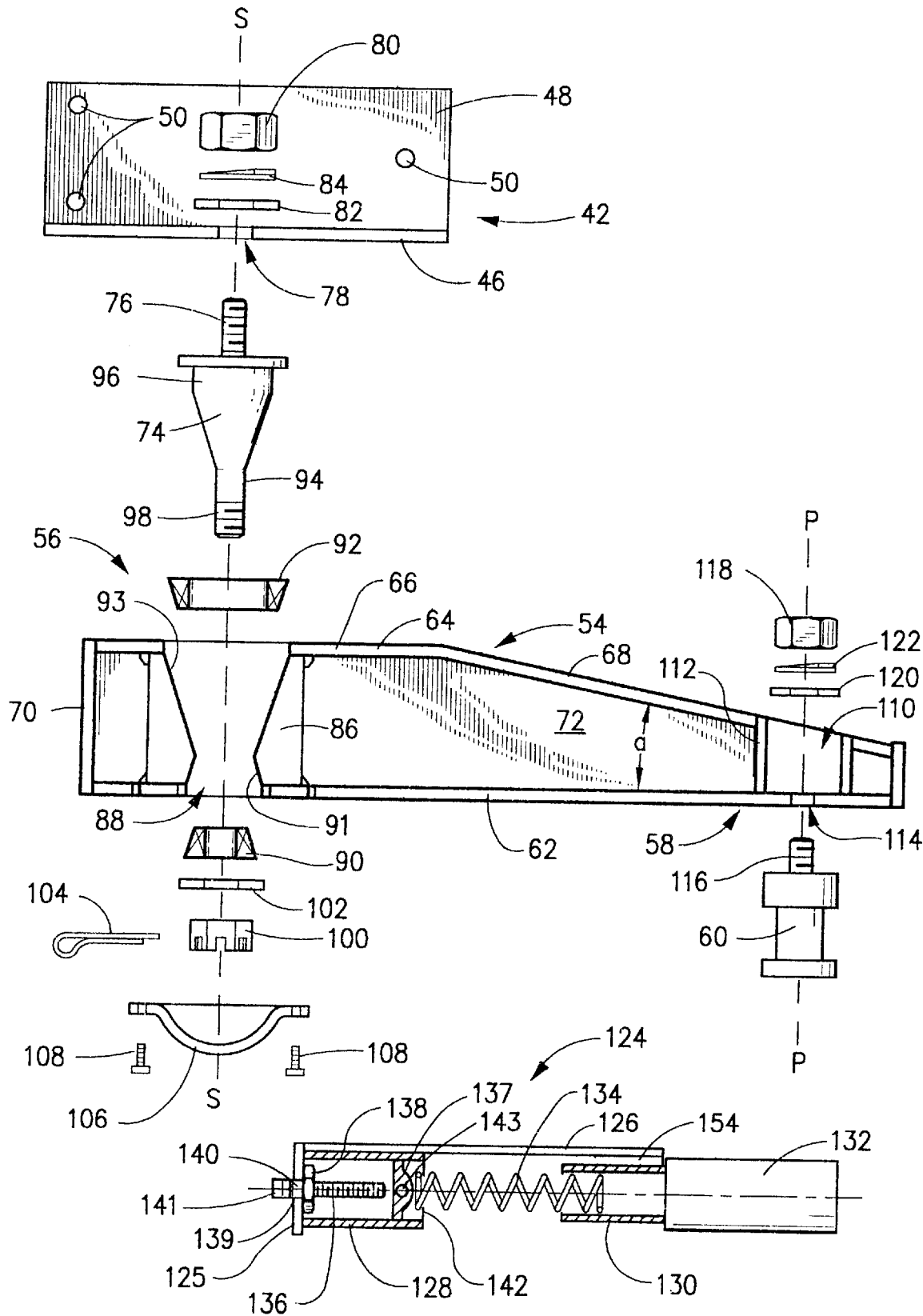
FIG. 8 is an exploded side view, in partial cross-section, showing the assembly of the extension coupling according to the present invention.

The construction of extension coupling 40 is shown in greater detail in FIG. 8. Here, it may be seen that elongated arm 54 is structured in the form of a hollow housing including a planar bottom wall 62 and a top wall 64 that is in opposed relation to bottom wall 62, top wall 64 includes a first top wall section 66 that is generally parallel to bottom wall 62 and a second tow wall section 68 that projects toward bottom wall 62 and is oriented thereto at an acute angle "a" so that arm 54 has a height, as measured between top and bottom walls 62 and 64 that diminishes in a direction toward distal end portion 58. A side wall 70 extends between bottom wall 62 and top wall 64 so as to enclose an interior 72 of arm 54.

As noted above, proximal end portion 56 of arm 54 is pivotally attached to mount 42. To this end, a spindle 74 has a threaded shaft 676 which extends through opening 78 formed in base plate 46 so that it may be secured rigidly to based plate 46 by means of a nut 80, flat washer 82 and locking washer 84. Thus, spindle 74 projects downwardly from mount 42 along a spindle axis "S" that is preferable parallel to 10 axis "P". Spindle 74 is of a type commonly used for a wheel mount for a non-driven wheel of a vehicle to connect the wheel to the axle thereof.

As still shown in FIG. 8, a female receiver 86 is disposed an interior 72 of arm 54 and is adapted to cooperatively receive spindle 74. To this end, receiver 86 has a passageway 88 therethrough. A first taper bearing 90 and a second taper bearing 92 are mountable at opposite ends of receiver 86 at bearing surfaces and 91 and 93 respectively. Spindle 74 includes bearing surfaces 94 and 96 that respectively engage bearing surfaces 91 and 93, and spindle 74 terminates in a threaded end shaft 98 that may be fastened by means of a nut 100, flat washer 102 and cotter pin 104, as is known in the art with suitable lubrication being packed therein. A protective cap 106 then mounts over bearing 90 and nut 100 by means of screws 108.

The mounting of connector pin 60 is also shown in FIG. 8. Here, second section 68 of top wall 64 has an enlarged opening 110 formed therethrough near distal end portion 58. A cylindrical wall 112 is then mounted through opening 110 so as to give access to an opening 114 formed through bottom wall 62 along pin access "P" in distal end portion 58. Connector pin 60 has a threaded pin shaft 116 which extends through opening 114 where it may be secured to proximal end portion 58 by means of a nut 118, flat washer 120 and locking washer 122.

Figure 9:
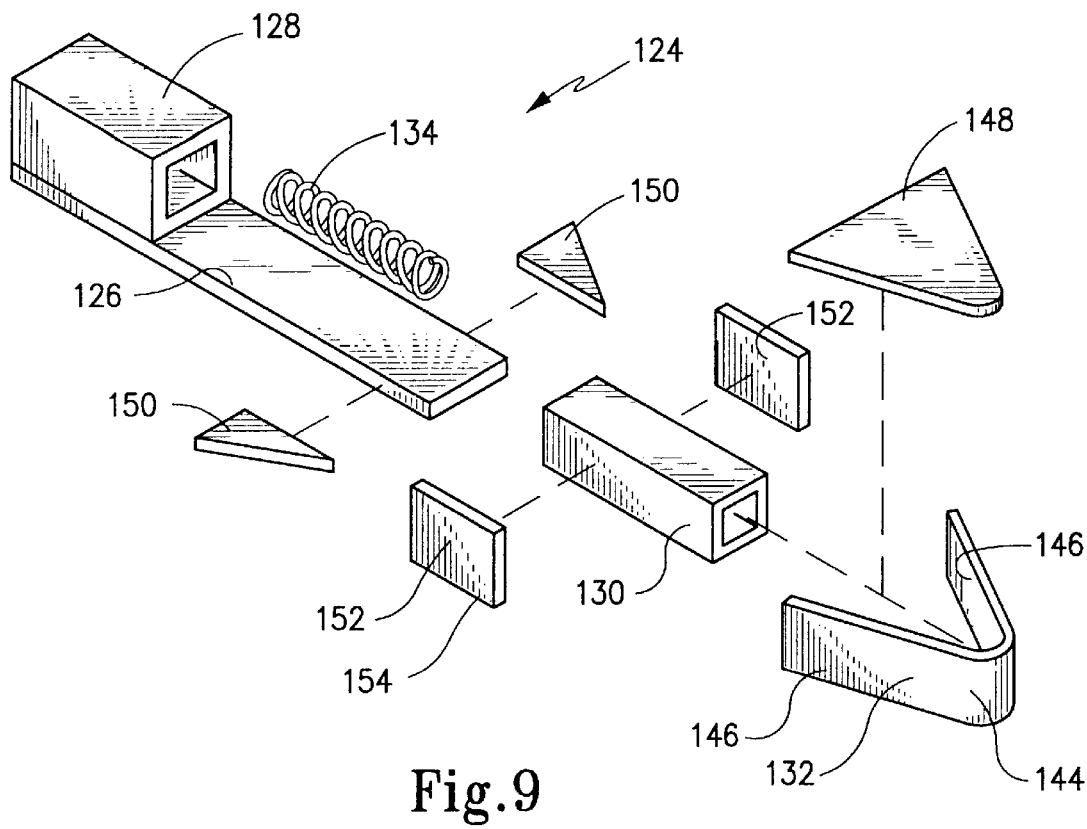
FIG. 9 is an exploded perspective view showing the construction of the latch assembly used on the present invention.

In order to complete the assembly of extension coupling 40, a retainer assembly 124 is provided and is mounted on the exterior portion of bottom wall 62. Retainer assembly 124 is best shown in FIGS. 6, 8 and 9. Here it may be seen that retainer assembly 124 includes a mounting bar 126 which mounts an outer telescoping member 128 that is adapted to telescopically receive an inner telescoping member 130. Telescoping members 128 and 130 are preferably tubular pieces of square shaped cross-section which are in telescopic engagement as is shown in FIG. 6. To this end, outer telescoping member 128 is affixed to mounting bar 126 that is in turn affixed to bottom wall 62 of arm 54. Inner telescoping member 130 supports an enlarged head piece 132 at an end thereof opposite outer telescoping member 128. A biasing spring 134 is then received in the interior of telescoping members of 128 so as to bias telescoping members 128, 130 apart from one another with a selected biasing force.

As is shown in FIG. 8, the biasing force of biasing spring 134 may be adjustable by means of a screw adjustment including a threaded shaft 136 which is rigidly affixed to stop nut 138. Shaft 136 has an unthreaded shank 139 which extends through an opening 140 in end wall 125. Shaft 136 terminates in a hexagonal head 141 exteriorly of telescoping member 128. A square-shaped plate 137 is threadably received on shaft 136 by means of bore 142. Plate 137 is shaped so as to nest in the interior of telescoping member 128 so that it may slide longitudinally thereof without rotation. Thus, rotation of hex head 141 causes plate 137 to translate back and forth in telescoping member 128. Plate 137 has a boss 143 which is sized to mate with spring 134 so that plate 137 supports one end of spring 134. Thus, the biasing force of spring 134 may be adjustable since spring 134 may be selectively pre-compressed.

With reference now to FIG. 9, it may be seen that head piece 132 is formed as a V-shaped member having a nose 144 so that it defines a tapered wedge having diverging side walls 146. A triangular plate 148 extends between side walls 146 so as to close one side of head piece 132. Inner telescoping member 130 is then received in head piece 132 and is secured thereto in any convenient manner, such as by welding or the like. A pair of triangularly shaped side plates 150 are secured on opposite side edges of mounting bar 126 at an end thereof opposite outer telescoping member 128, again by welding or other technique. Rectangular side plates 152 are affixed to the side walls of inner telescoping member 130 and are disposed on opposite sides thereto. Side plates 152 have a width that is greater than the height of inner telescoping member 130 so that a marginal portion 154 projects to engage side plates 150, as is shown in FIG. 6, thus to define a limit stop to prevent latch mechanism 124 from becoming disassembled under the force of spring 132.

Figure 7:
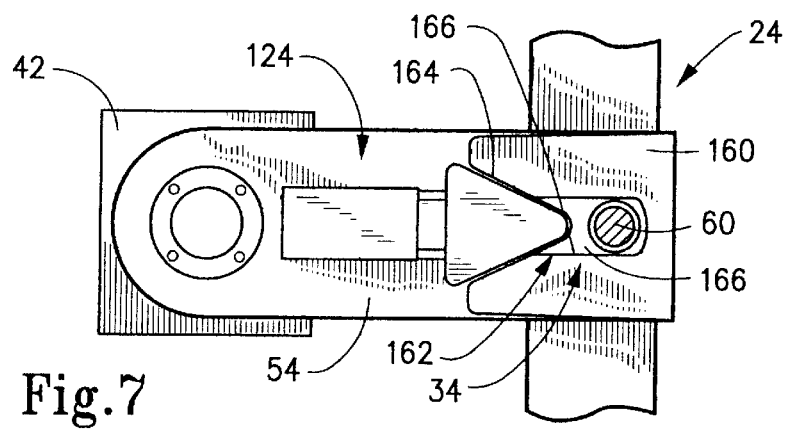
FIG. 7 is a bottom plan view, in partial cross-section, showing the interconnection of the extension coupling of FIGS. 5 and 6 into a fifth-wheel hitch.

With reference now to FIG. 7, it may be seen that connector pin 60 and latch mechanism 124 are adapted to engage fifth-wheel bed hitch 24 when the trailer is interconnected to the tow hitch 24 so as to resist rotation of arm 54 relative to the tow hitch 24. As is shown in this figure, tow hitch 24 has a bracket 160 including a slot 162 that is sized to receive connector 60. Slot 162 terminates a V-shaped open mouth 164 which facilitates entry of pin 60 into slot 162 when the trailer vehicle is coupled to the tractor vehicle. A locking mechanism 34 incudes a pair of locking arms 166 adapted to releaseably engage connector pin 60 so as to retain it in a locked condition with respect to hitch 24. It may now be seen in this figure, when connector pin 60 is received in hitch 24, head piece 132 of latch mechanism 124 engages triangularly-shaped mouth 164 of bracket 160 with this engagement compressing spring 134 into a compressed state. The action of spring force caused by spring 134 thus is in a radial direction to pin axis "P" and serves in conjunction with wedge-shaped head piece 132 to resist rotation or arm 154 relative to the tow hitch 24. Accordingly, trailer 10 is confined for pivoting about spindle axis "S".

Figure 10:
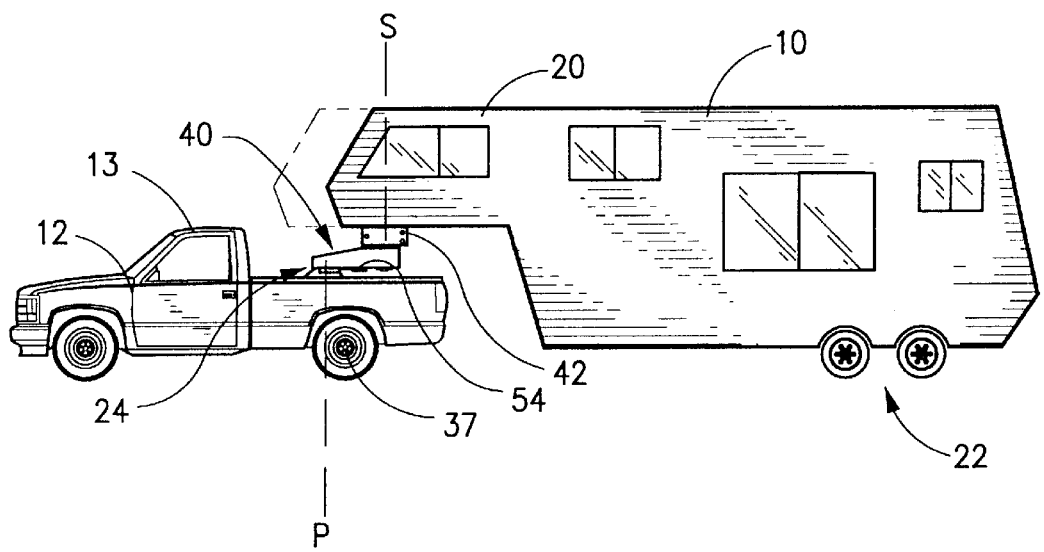
FIG. 10 is a side view in elevation showing the use of the extension coupling of the present invention with a truck and trailer combination.

With reference now to FIG. 10, it may be seen that, by using extension coupling 40, the forward weight of trailer 10 is supported by tow hitch 24 forwardly of rear axle 37 while at the same time extension arm 54 acts to displace the position of trailer 10 rearwardly from the position shown in phantom. This allows a greater clearance between cab 13 and front portion 20 so that the turning angle between truck 12 and trailer 10 may be increased without risking damage to either trailer 10 or cab portion 13. At the same time, trailer 10 may pivot during turning about spindle axis "S" in a standard manner since arm 50 does not pivot significantly with respect to hitch 24 due to latch mechanism 124, described above.

Accordingly, the present invention has been described with some degree of particularity directed to the exemplary embodiment of the present invention. It should be appreciated, though, that the present invention is defined by the following claims construed in light of the prior art so that modifications or A changes may be made to the exemplary embodiment of the present invention without departing from the inventive concepts contained herein.

I claim:

1. An extension coupling adapted to releasably interconnect a trailer to a tow hitch located on a tractor vehicle, comprising:

(a) a mount adapted to be secured to the trailer;
    (b) an elongated arm having a proximal end portion pivotally secured to said mount and a distal end portion opposite said proximal end portion;
    (c) a connector pin disposed on said distal end portion and adapted to releasably mate with said tow hitch; and
    (d) a retainer assembly secured to said elongated arm with said connector pin, said retainer assembly engaging said tow hitch when said trailer is interconnected therewith, said retainer assembly operative to resist rotation of said arm relative to said tow hitch with a resistance force.

2. An extension coupling according to claim 1 wherein said connector pin projects from the distal end portion along a pin axis, said retainer assembly including a head piece biased toward said connector pin in a radial direction toward the pin axis.

3. An extension coupling according to claim 2 wherein said retainer assembly includes an inner telescoping member telescopically received in and outer telescoping member and a spring element operative to bias said inner and outer telescoping members apart, said head piece being disposed on one of said inner and outer telescoping members.

4. An extension coupling according to claim 2 wherein said head piece is structured as a tapered wedge having a forward nose and diverging sidewalls.

5. An extension coupling according to claim 1 including an adjuster associated with said retainer assembly, said adjuster operative to selectively vary the resistance force.

6. An extension coupling according to claim 1 wherein said mount includes a spindle member extending therefrom along a spindle axis, said arm including a receiver sized and adapted to rotatably receive said spindle member whereby said arm is pivotable with respect to said mount about the spindle axis.

7. An extension coupling according to claim 6 wherein said arm is structured as a housing including a top wall, a bottom wall opposed to said top wall and a housing sidewall, said receiver including a pair of opposed bearing assemblies respectively disposed on said top wall and said bottom wall.

8. An extension coupling according to claim 7 wherein said bottom wall is planar in configuration, said top wall including a first top wall section that is parallel to said bottom wall and a second top wall section that projects toward said bottom wall and is oriented at an acute angle with respect to said bottom wall such that said arm has a height as measured between said top and bottom walls with the height at said proximal end portion being greater than the height at said distal end portion.

9. An extension coupling adapted to releasably interconnect a trailer to a tow hitch located on a tractor vehicle wherein said trailer has a hitch connecting station, comprising:

(a) a mount adapted to be secured to said hitch connecting station of said trailer, said mount including a flat base plate and a pair of upwardly projecting side plates disposed on said base plate in spaced-apart opposed relation to one another, said side plates sized and adapted to releasably engage said hitch connecting station;
    (b) an elongated arm;
    (c) a pivot coupling interconnecting said base plate and a proximal end potion of said arm, said pivot coupling including a rotatable shaft journaled for rotation on a first axis to said proximal end portion of said arm and a fastener connecting said shaft to said base plate; and
    (d) a connector post disposed on a distal end portion of said arm and extending along a second axis, said connector post adapted to releasably mate with said tow hitch.

10. An extension coupling according to claim 9 wherein said hitch connecting station includes a pair of opposed mounting plates which downwardly depend from said trailer, said side plates oriented to matably receive said mounting plates.

11. An extension coupling according to claim 10 wherein said fastener connects said shaft to said base plate such that said shaft extends outwardly of said mount to define a spindle, said arm including a receiver in said proximal end thereof, said receiver operative to rotatably secure said shaft.

12. An extension coupling according to claim 11 wherein said receiver including a pair of spaced-apart bearings each operative to engage a portion of said shaft.

13. An extension coupling according to claim 9 wherein said connector post includes a base portion adjacent to the distal end portion of said arm, a shoulder portion opposite said base portion and a waist portion extending between said base and shoulder portions.

14. An extension coupling according to claim 9 including a retainer assembly associated with said connector pin, said retainer assembly engaging said tow hitch when said trailer is interconnected therewith, said retainer assembly operative to resist rotation of said arm relative to said tow hitch with a resistance force.

15. An extension coupling according to claim 14 wherein said retainer assembly includes an outer telescoping member connected to said arm, an inner telescoping member having a first end portion matably received in said outer telescoping member, a spring element operative to bias said inner and outer telescoping members apart from one another and a head piece disposed on a second end portion of said inner telescoping member opposite the first end portion.

16. An extension coupling according to claim 15 including an adjuster associated with said retainer assembly, said adjuster operative to selectively vary biasing force of said spring element.

17. An extension coupling according to claim 9 wherein said arm is structured as a hollow housing including a planar bottom wall, a top wall in opposed relation to said bottom wall and a sidewall extending between said bottom and top walls, said top wall having a first top wall section that is parallel to said bottom wall and a second top wall section oriented at an acute angle with respect to said bottom wall.

18. A trailer adapted to be towed by a tractor vehicle that has a tow hitch, said trailer adapted to releasably interconnect to said tow hitch whereby said trailer is movable by said tractor vehicle, comprising:
- (a) a trailer housing;
- (b) a wheel set associated with said trailer housing and supporting said trailer housing for advancement along a roadway;
- (c) a hitch connecting station including a pair of downwardly depending mounting plates disposed on a front portion of said trailer housing;
- (3) a coupling operative to interconnect said trailer housing and said tow hitch whereby said trailer can pivot about a vertical pivot axis that is located at said hitch connecting station while resisting rotation about a vertical pin axis that is located at the tow hitch, said coupling including:
    - (i) a mount having a flat base plate and pair of opposed side plates projecting upwardly on opposite sides of said base plate, said side plates sized and adapted to releasably engage said mounting plates;
    - (ii) an elongated arm having a proximal end portion pivotally secured to said mount and a distal end portion opposite said proximal end portion;
    - (iii) a connector disposed on said distal end portion and adapted to releasably mate with said tow hitch; and
    - (iv) a retainer assembly operative to engage said tow hitch when said trailer is interconnected therewith, said retainer assembly operative to resist rotation of said arm relative to said tow hitch.

19. A trailer according to claim 18 wherein said tow hitch has a V-shaped open mouth through which said connector passes to engage locking arms therein, said retainer assembly including a head piece sized and adapted to mate with the open mouth of said tow hitch thereby to resist rotation of said arm relative to said tow hitch.

20. A trailer according to claim 18 wherein said mount includes a spindle member extending therefrom along a spindle axis, said arm including a receiver sized and adapted to rotatably receive said spindle member whereby said arm is pivotable with respect to said mount about the spindle axis.

* * * * *